(12) United States Patent
Seeley

(10) Patent No.: US 11,385,130 B2
(45) Date of Patent: Jul. 12, 2022

(54) MULTI-SPECTRAL FEATURE SENSING TECHNIQUES AND SENSORS FOR DETERMINING A PHASE SHIFT BY COMPARING A MEASURED NARROWBAND RESPONSE TO A KNOWN WIDEBAND RESPONSE

(71) Applicant: Ryan Seeley, North Logan, UT (US)

(72) Inventor: Ryan Seeley, North Logan, UT (US)

(73) Assignee: Ryan Seeley, North Logan, UT (US)

( * ) Notice: Subject to any disclaimer, the term of this patent is extended or adjusted under 35 U.S.C. 154(b) by 0 days.

(21) Appl. No.: 17/301,730

(22) Filed: Apr. 13, 2021

(65) Prior Publication Data
US 2021/0231526 A1 Jul. 29, 2021

Related U.S. Application Data

(63) Continuation-in-part of application No. 16/799,627, filed on Feb. 24, 2020, now Pat. No. 11,137,271.

(60) Provisional application No. 62/808,937, filed on Feb. 22, 2019.

(51) Int. Cl.
*G01B 9/02* (2022.01)
*G01M 11/00* (2006.01)

(52) U.S. Cl.
CPC ..... *G01M 11/3172* (2013.01); *G01B 9/02044* (2013.01); *G01B 9/02084* (2013.01)

(58) Field of Classification Search
CPC .. G01B 9/02044; G01B 9/02; G01B 9/02041; G01B 9/02064; G01B 9/02079; G01B 9/02081; G01B 9/02083; G01M 1/00; G01M 11/00

USPC .................................. 250/214 R, 214.1, 221
See application file for complete search history.

(56) References Cited

U.S. PATENT DOCUMENTS

| 4,750,139 A * | 6/1988 | Dils ....................... G01J 5/602 374/161 |
|---|---|---|
| 6,024,488 A | 2/2000 | Wu et al. |
| 2001/0030281 A1 | 10/2001 | Schulz et al. |
| 2005/0111793 A1 | 5/2005 | Grattan et al. |
| 2007/0156019 A1 | 7/2007 | Larkin et al. |
| 2009/0123111 A1 | 5/2009 | Udd |
| 2010/0259752 A1 | 10/2010 | Shah et al. |
| 2012/0103066 A1 | 5/2012 | Xia et al. |

FOREIGN PATENT DOCUMENTS

WO 2018/089831 A1 5/2018

\* cited by examiner

*Primary Examiner* — Que Tan Le
(74) *Attorney, Agent, or Firm* — TraskBritt

(57) ABSTRACT

Multi-spectral feature sensing techniques and sensor and related digital signal processing circuitry and methods. A method of operating a digital signal processing circuitry includes acquiring optical frequency domain reflectometry (OFDR) data from an interferometer operably coupled to a tunable laser and a sensing fiber, separating sensor signals corresponding to sensors of the sensing fiber from the OFDR data, and inferring a relative shift of a separated sensor signal. A digital signal processing circuitry includes a front end circuitry and a back end circuitry. The front end circuitry is configured to isolate sensor responses from an input signal including OFDR data. The back end circuitry is configured to determine a phase shift corresponding to each isolated sensor response.

20 Claims, 11 Drawing Sheets

MULTI-SPECTRAL FEATURE SENSING TECHNIQUES AND SENSORS FOR DETERMINING A PHASE SHIFT BY COMPARING A MEASURED NARROWBAND RESPONSE TO A KNOWN WIDEBAND RESPONSE

CROSS-REFERENCE TO RELATED APPLICATIONS

This application is a continuation-in-part of U.S. patent application Ser. No. 16/799,627, filed Feb. 24, 2020, titled MULTI-SPECTRAL FEATURE SENSING TECHNIQUES AND SENSORS, which claims the benefit under 35 U.S.C. § 119(e) of U.S. Provisional Patent Application Ser. No. 62/808,937, filed Feb. 22, 2019, titled MULTI-SPECTRAL FEATURE SENSING TECHNIQUES AND SENSORS, the disclosures of which are hereby incorporated herein in their entireties by reference.

TECHNICAL FIELD

This disclosure relates generally to optical sensors. In particular, various embodiments of this disclosure relate to an optical frequency domain reflectometry (OFDR) system and methods to perform distributed or quasi-distributed sensing of strain, temperature, and/or other effects that may be transduced to strain and or temperature along a sensing fiber.

BACKGROUND

Fiber-optic sensors are used for their low cost, excellent spatial coverage, small size, light weight, minimal associated intrusion, high accuracy, and reliability. Optical sensors embedded in an optical fiber sense strain (e.g., compression and tension), temperature, and/or other effects acting on an object or device under test (DUT). Strain acting on, or temperature of, the object effect physical changes in the sensing fiber that may be identified and measured by the optical sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
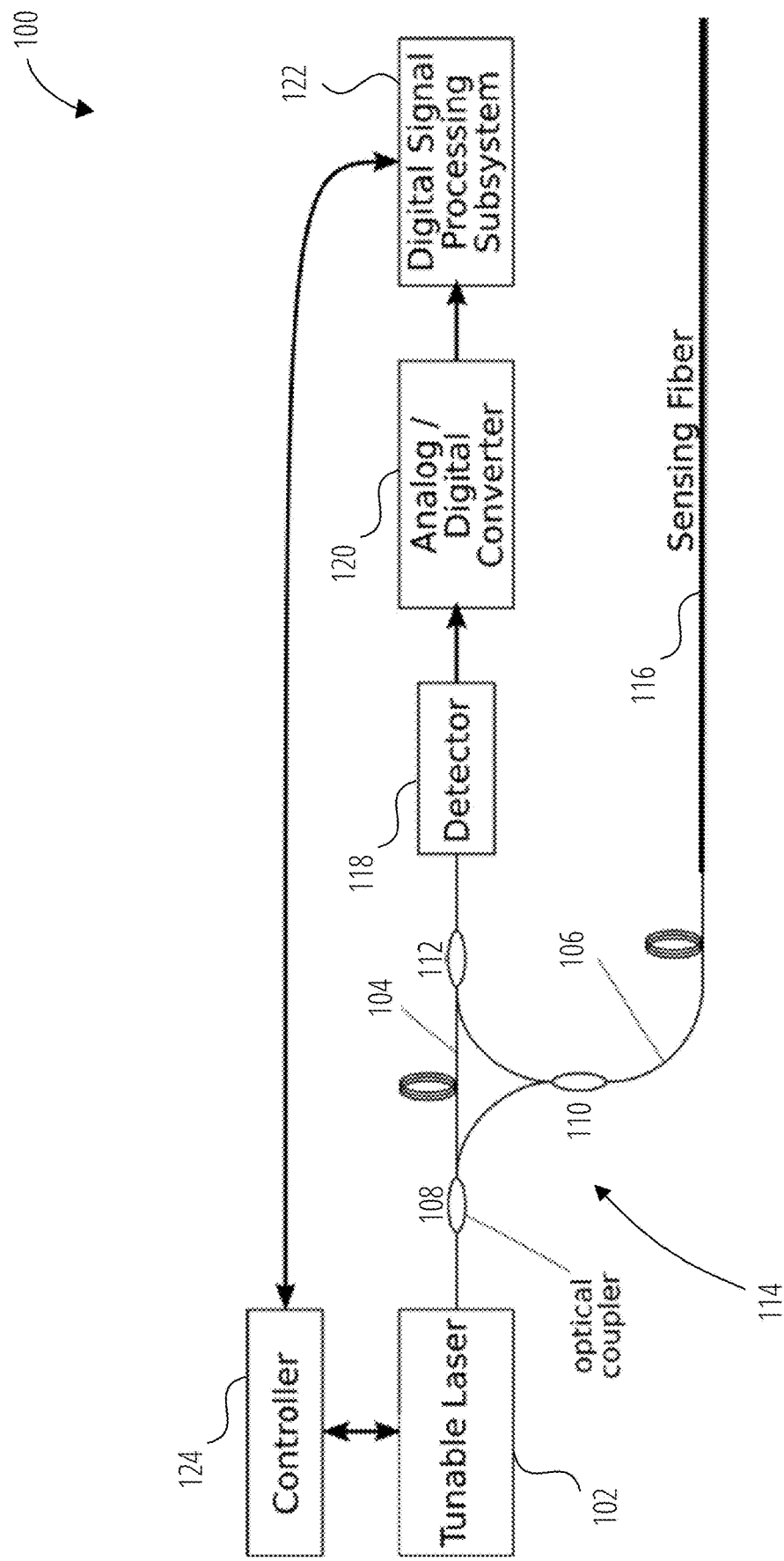
FIG. 1 is a block diagram of a conventional OFDR system.

The various embodiments described here comprise an OFDR system and technique that allows for inference of strain or temperature over a large dynamic range using a narrow wavelength range. Embodiments of the sensor fiber may be composed of one or more multi-spectral-feature sensors, each sensor exhibiting several spectral features that together offer coverage over a wavelength range corresponding to the desired system strain and/or temperature dynamic range. As used herein, a "spectral feature" is a feature of functional form (e.g., a lobe, a peak, a trough, or other functional form) discernible in the spectral domain. Embodiments of the disclosure may comprise a number of multi-spectral-feature sensors including sensors comprised of multiple chirped-frequency (or substantially chirped-frequency) FBGs.

Various embodiments of fiber-optic sensors described herein reduce the required OFDR interrogation wavelength range by approximately an order of magnitude relative to conventional OFDR systems. In one embodiment, a fiber-optic sensor is formed by two closely-spaced, chirped fiber-Bragg gratings (CFBGs) having different chirp slopes. The pair of CFBGs forms a Fabry-Perot (FP) cavity with linearly-varying (sloped) FP cavity length versus wavelength; the sensor is therefore denoted as a CFBG-SFP sensor herein. (Note that the pair of CFBGs may be nonlinearly chirped such that the Fabry-Perot cavity length need not vary linearly versus wavelength). The sensor is described in more detail, below.

One of ordinary skill in the art will understand that the order-of-magnitude reduction in wavelength range afforded by the proposed sensor leads to many advantages, including: (1) an order of magnitude decrease in OFDR bandwidth for a given sensing length, (2) an order of magnitude increase in sensing length for a given OFDR bandwidth, and/or (3) a combination of improvement in both OFDR bandwidth and sensing length. In addition, the subject technology allows for a reduction of roughly an order of magnitude in operational laser sweep range.

Conventional commercial off-the-shelf (COTS) OFDR systems exhibit a sensor spacing of ~1 cm, sensing length of 10-50 m per channel and system sample rates of 100-250 Hz. Given similar acquisition hardware, embodiments of the proposed sensor described herein may, for example, be used to extend the sensing length to hundreds of meters per channel or to extend the sample rate to tens of kHz. Unlike current FBG-based COTS systems, there would be no reduction in strain/temperature dynamic range as the system sample rate is increased—full dynamic range is inherently supported at full sample rate. By way of example, for a ±10,000 µε OFDR system typically requiring a 24 nm system scan range, the CFBG-SFP sensor is estimated to require only an approximate 2 nm scan range to unambiguously demodulate the sensor over the full strain range with comparable accuracy and repeatability to the current state of the art.

Fiber Bragg grating (FBG) optical fiber sensors exhibit a wavelength-selective reflection or transmission spectrum. The sensor is created by inducing a periodic refractive index profile within the core of an optical fiber, and exhibits a spectrum center (Bragg) wavelength $\lambda_B$ proportional to the period of refractive index variation $\Lambda$ per the relation $\lambda_B = 2n_e\Lambda$, where $n_e$ is the effective index of refraction within the grating. As tension or compression is longitudinally imparted on the fiber sensor, the spatial period of the refractive index profile is lengthened or shortened leading to an increase or decrease, respectively, of the center wavelength of the reflected spectrum. In addition, as the FBG is heated or cooled, the effective index of refraction is altered resulting in a proportionally-shifted center wavelength. Thus, by detecting the center wavelength shift of the reflection spectrum in an operational state relative to a nominal (i.e., calibration) state, a user may infer the strain or temperature difference between states. Though an FBG sensor is dually-sensitive to both strain and temperature, techniques exist for discrimination between strain and temperature.

Optical sensors are used to measure and characterize an object of interest (e.g., an object or device under test, without limitation) under mechanical stress as well as actively monitor it during operation. For example, optical sensors are used to test and characterize medical equipment, machinery, airframes, spaceframes, etc., as well as monitor them during operation.

OFDR-based sensor systems are typically utilized for applications in which high spatial resolution (e.g., several millimeters (mm) or less) is of key interest. Indeed, if a wide wavelength sweep range is employed, it is possible to differentiate response within an optical fiber on the scale of 10s of microns over 10s of meters of fiber.

Various embodiments of the disclosure comprise OFDR systems and techniques for optical sensors and interrogators that allow for inference of strain or temperature over a given dynamic range using narrow wavelength sweeps.

Embodiments of sensors of the present disclosure exhibit several spectral features that together offer coverage of a wavelength range corresponding to the desired strain dynamic range (or temperature range) of the system. The spectral features arise from a Fabry-Perot interferometer formed by two overlapping chirped FBGs, the free-spectral range (FSR) of which varies with wavelength. The spectral features may be differentiated due to the combination of spacing and slope of the overlapped, chirped gratings, which guarantees that the range of possible FSR (for a given strain dynamic range) differs from the range of possible FSR of neighboring spectral features.

In various embodiments, sensors are described that comprise overlapped chirped FBGs that may form a multi-grating unit, each chirped FBG of a unit having a unique chirp slope and a specific spacing between other FBG(s) of the unit, yielding a Fabry-Perot response the FSR of which varies over the wide wavelength range corresponding to the desired strain (and or temperature) dynamic range, and thus yielding spectral features spaced across the wide wavelength range. In various embodiments of the systems and methods described herein, one may infer the complete strain and/or temperature profile over a dynamic range not normally obtainable with the small wavelength range.

Those of ordinary skill in the art will understand that the embodiments described herein are scalable and other embodiments may be applied to narrower ranges than those specifically described. Depending on the application, some embodiments may be applied at wavelength ranges orders of magnitude narrower than what is described.

In some embodiments a method of operating a digital signal processing circuitry includes acquiring optical frequency domain reflectometry (OFDR) data from an interferometer operably coupled to a tunable laser and a sensing fiber, separating sensor signals corresponding to sensors of the sensing fiber from the OFDR data, and inferring a relative shift of a separated sensor signal.

In some embodiments a digital signal processing circuitry includes a front end circuitry and a back end circuitry. The front end circuitry is configured to isolate sensor responses from an input signal including optical frequency domain reflectometry (OFDR) data. The back end circuitry is configured to determine a phase shift corresponding to each isolated sensor response.

FIG. 1 shows a typical OFDR system 100 known to the inventor of this disclosure. The OFDR system 100 includes a laser 102, a fiber-optic interferometer 114, a sensing fiber 116, a detector 118, an analog to digital converter 120, a digital signal processing subsystem 122, and a controller 124. A continuous-wave laser 102 is employed and the laser output is tuned linearly in optical frequency over a given wavelength range. Light exiting the laser 102 is split into a reference path 104 and a measurement path 106, respectively, of a fiber-optic interferometer 114. Reference-path light exits an upper fiber of coupler 108 in the diagram and passes through a delay path to coupler 112. Measurement-path light exits the lower fiber of coupler 108 and passes through coupler 110 to a sensing fiber 116. In a typical OFDR sensing setup, the sensing fiber 116 includes a series of weak FBGs forming a quasi-distributed fiber sensor. These FBGs are typically ~10 mm in length with or without a gap between each sensor. Light reflects from a continuum of locations along the sensing fiber 116 corresponding to regions in which FBGs have been written. The back-reflected light enters coupler 110, exits the right-hand fiber from coupler 112 in the diagram, and combines and/or interferes with reference light at coupler 112. FIG. 1 is a simplified diagram and the description therefore is simplified; other optical components may be included to improve performance and lend polarization diversity to the system.

Consider reflection from a single location within the sensing fiber 116 (in the interferometer measurement path) located at an optical time-of-flight delay $\tau_M$. This back-reflected light will interfere with reference light that underwent an optical delay $\tau_R$. If the optical field exiting the laser 102 is denoted $\rho(t)e^{i\phi(t)}$, where $\rho(t)$ and $\phi(t)$ are the time-varying amplitude and phase of the laser output, respectively, the interference signal measured at the detector 118 may be given by:

$$ID = \text{slowly-varying terms} + 2\rho(t)^2 \alpha_M \alpha_R \cos(\phi(t-\tau_M) - \phi(t-\tau_R)),$$

where $\alpha_M$ and $\alpha_R$ are the cumulative losses through the measurement and reference paths, respectively. If a laser 102 is swept linearly in optical frequency, one may describe the optical frequency of light exiting the laser 102 as:

$$v(t)=v_0+kt,$$

where k is the sweep speed in Hertz per second (Hz/s), and t is time. The laser phase is the integral of the optical frequency, $$\phi(t) = \phi_o + 2\pi v_o t + 2\pi \frac{kt^2}{2},$$

and it may be depicted that, within a phase constant, $$\phi(t-\tau_M)-\phi(t-\tau_R)=-2\pi kt(\tau_M-\tau_R)$$

High-pass filtering (AC-coupling) the detector intensity signal $I_D$ and substituting the above relation, one arrives at the relation $$\tilde{I}_D \propto \alpha_M \cos(\omega t); \omega=2\pi k\Delta\tau_{MR},$$

where $\tilde{I}_D$ is the time-varying component of the detector intensity, and $\Delta\tau_{MR}=\tau_M-\tau_R$ (and where again, a phase constant has been dismissed). Thus, the cumulative loss $\alpha_M$ in the measurement path is frequency-encoded as a function of delay down the sensing fiber 116.

The inventor of this disclosure appreciates that the above treatment assumes there is only one back-reflection event located at optical delay $\tau_M$ down the sensing fiber 116, and further appreciates that there is a superposition of back-reflected optical fields at a continuum of delays down the sensing fiber 116. It can be depicted that the entire distributed complex reflectance of the sensing fiber 116 is encoded by modulation frequencies proportional to a continuum of time-of-flight measurement-path delays.

$\tilde{I}_D$ can be Fourier-transformed to reveal a signal proportional to the complex reflectance as a function of delay (i.e., distance) down the sensing fiber 116. If a series of FBGs is written into the sensing fiber 116, they can all be written at the same nominal center wavelength. Each grating will appear as a rect-like function in this transform-domain representation (or as a function indicative of the apodization if an apodized grating is used). In an implementation simplified for ease of illustration, individual gratings may then be windowed in the transform domain and inverse-transformed back to the spectral domain to separate the response of each grating from that of other gratings within the sensing fiber 116. The resulting signal for each grating is reflectance versus optical frequency, from which the center wavelength and therefore strain or temperature may be inferred.

Returning to FBG theory, one can calculate a wavelength range $\Delta\lambda_B$ required to accommodate a given required strain dynamic range $\Delta\varepsilon$ as $$\Delta\lambda_B=K_G\lambda_B\Delta\varepsilon,$$

where $K_g$ is the coefficient of strain. For standard optical fiber and a nominal Bragg wavelength $\lambda_B=1550$ nm, the required wavelength range is approximately 24 nm for a ±10,000 µε dynamic range. Thus, the laser 102 employed in a typical ±10,000 µε sensing system must be capable of linearly sweeping over a 24 nm wavelength range. What is more, for a given system sample rate $f_s$, the total range $\Delta\lambda_B$ must be swept in a time period $T_s=1/f_s$. This puts a constraint on the required sweep speed of the laser 102 such that $$k=\Delta v_B f_s,$$

where $\Delta v_B$ is the optical frequency equivalent of $\Delta\lambda_B$, giving $$\omega=\Delta v_B 2\pi f_S \Delta\tau_M.$$

Thus, the modulation frequency associated with a given measurement delay $\tau_M$ is proportional to the required wavelength range $\Delta\lambda_B$ and in turn proportional to $\Delta\varepsilon$. Thus, as the strain dynamic range is increased—all other parameters being equal—the modulation frequency also increases and thus the sample rate of the front-end acquisition hardware must also increase.

Thus, the inventor of this disclosure appreciates that existing OFDR systems suffer from specific limitations related to interdependencies between strain (or temperature) dynamic range of the system, system sample rate, and sensing length. These interdependencies result in a sensing technology that exhibits fundamental limits with respect to key system characteristics of interest (i.e., sensing length, system update rate, and or dynamic range).

For example, assume that the strain dynamic range of the system is fixed and an increased sensing length is desired. In conventional OFDR systems, the strain dynamic range is proportional to the required wavelength range that will be demodulated. For a given signal bandwidth, the length of sensing fiber 116 that may be interrogated is inversely proportional to the sweep speed of the light source. Thus, if an increased sensing length is required, the sweep speed must be decreased. For a fixed wavelength range (fixed strain dynamic range), the system sample rate will decrease because more time will be required per sweep in order for the swept-wavelength light source to sweep the given wavelength range at a lower speed. Similarly, if the system sample rate is increased, the sweep speed will increase and so the sensing length will decrease.

In a second example, assume that the system sample rate is fixed and an increased sensing length is desired. Since the time period over which the wavelength sweep must be performed is fixed (due to the fixed system sample rate, the inverse of which defines the sweep time period), and since an increased sensing length requires a slower sweep speed, the wavelength range and therefore strain dynamic range will decrease. Alternatively, if it is desired to increase the strain dynamic range, the sensing length will decrease.

In a third example, assume that the sensing length is fixed and an increase in system sample rate is desired. An increase in system sample rate means there is less time to perform the wavelength sweep. The fixed sensing length, however, requires that the sweep speed also be fixed. Thus, the wavelength range and therefore the strain (or temperature) dynamic range will decrease. Similarly, if the strain dynamic range is increased, the system sample rate will decrease.

The inventor of this disclosure appreciates that one option for narrowing the wavelength sweep range is to use overlapped single-frequency fiber Bragg gratings (FBGs) with specific combinations of wavelength spacing between spectral peaks and/or specific patterns of reflection amplitude being exhibited by the individual overlapped gratings. The individual single-frequency FBGs yielding the multi-wavelength spectral response are completely overlapped; the specific patterns of wavelength spacing and/or reflection amplitude may be used to unambiguously identify which spectral lobes lie outside the narrow wavelength sweep (i.e., which are not included in the narrow wavelength sweep).

However, the inventor of this disclosure appreciates that such a method exhibits a reduced wavelength range that must necessarily include three or more reflection peaks in order to unambiguously identify which overlapping FBG belongs to a given reflection peak. This is especially the case where there are many overlapping FBGs in one sensor.

Some overlapped FBG systems have introduced specific modifications to reflectance amplitude of the individual overlapped FBGs to characterize the reflection peaks. In addition to adding complexity to the grating fabrication process, this also results in a greater wavelength spacing (and greater resultant narrow wavelength range) than would otherwise be required since the wavelength spacing must ensure that low-reflectance wavelength peaks may correctly be resolved in the presence of high-reflectance peaks. Other overlapped FBG systems rely on specific patterns of wavelength spacing between neighboring spectral response of overlapped FBGs. This necessarily increases the minimum wavelength spacing between spectrally-neighboring grating center wavelengths and thus increases the minimum narrow wavelength range required to unambiguously identify which spectral-domain peaks are not included within the narrow wavelength range.

The inventor of this disclosure appreciates that conventional OFDR systems and overlapped FBGs, may also use a spectrogram calculation that leads to reduced delay-domain resolution along the sensing fiber. Significant local strain gradients over a spatial scale on the order of the delay-domain resolution will result in broadening of spectral-domain reflection peaks. Since, in theory, it is not possible to otherwise isolate the individual spectral-domain response resulting from each of the overlapped gratings, the wavelength spacing between center wavelengths of the overlapped FBGs needs to be increased in order to differentiate the broadened peaks. This in turn results in a wider reduced wavelength range than would otherwise be required.

Finally, such systems may require many overlapped FBGs, i.e., many exposures of the fiber to phase masks of varying period, or singe exposure to an expensive and difficult to fabricate multi-period phase mask.

Limitations and disadvantages in addition to and/or different than those discussed above may also exist.

Accordingly, the inventor of this disclosure appreciates a need for an OFDR-based optical sensor and interrogator, and systems that use the same, which does not have the same limitations and disadvantages of conventional systems.

Figure 2:
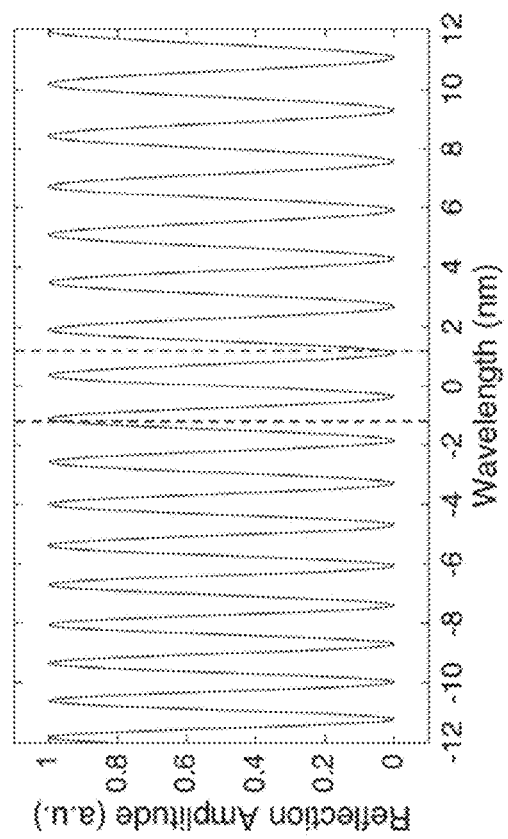
FIG. 2 is a graph depicting a comparison of an example spectral response of a conventional FBG sensor (left) known to the inventor of this disclosure and an example spectral response of an embodiment of CFBG-SFP sensor (right) corresponding to an embodiment depicted in FIG. 4.
Figure 2:
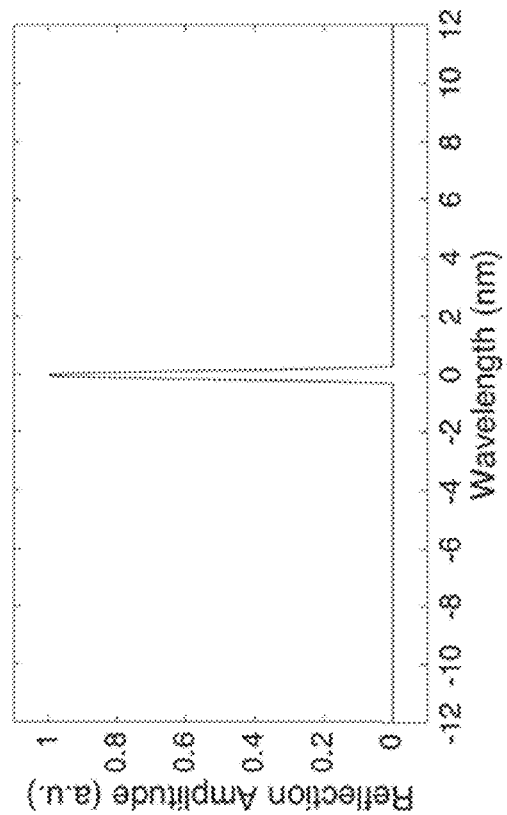
Figure 4:
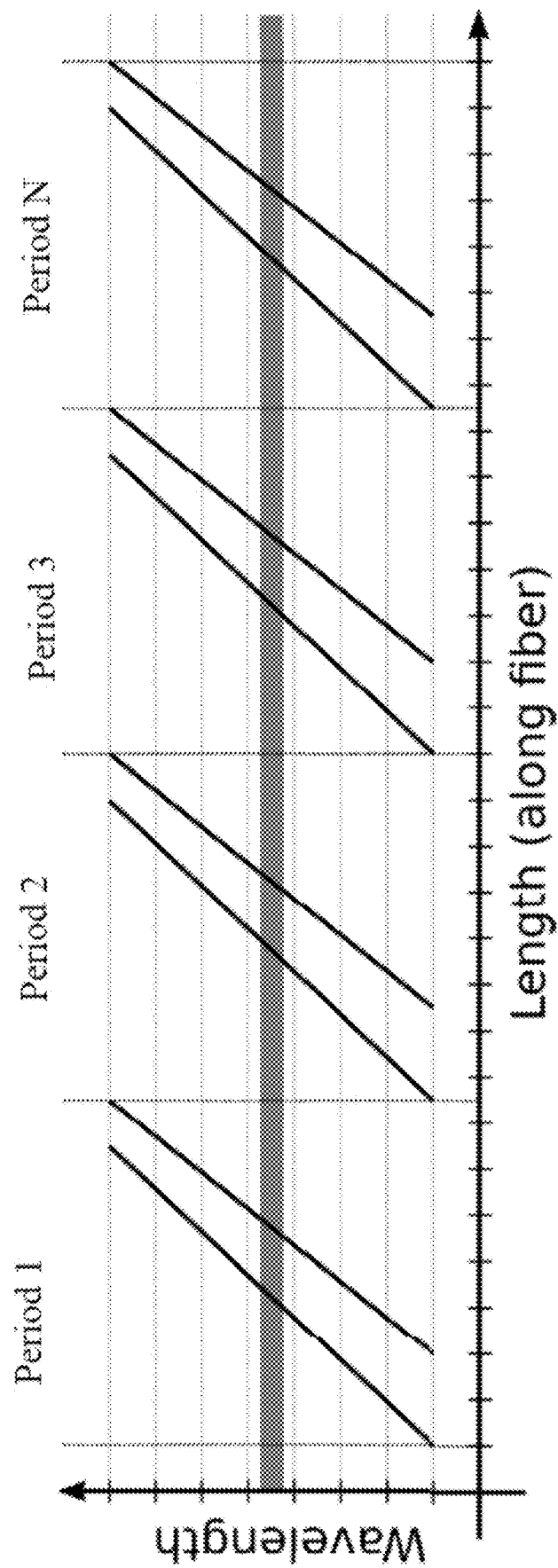
FIG. 4 is a diagram depicting an embodiment of a sensing unit including four CFBG-SFP sensors arranged along a portion of an optical fiber.

FIG. 2 is a graph depicting a comparison of an example spectral response of a conventional FBG sensor (left) known to the inventor of this disclosure and an example spectral response of an embodiment of CFBG-SFP sensor (right) corresponding to an embodiment depicted in FIG. 4. One embodiment described herein is a specialized fiber-optic sensor and associated demodulation algorithm that may be used for OFDR-based distributed sensing. Where a standard FBG sensor exhibits a single-lobe reflection spectrum as depicted in the left side of FIG. 2, the sensor described herein may exhibit a response periodic in wavelength, with linear change in the period as depicted in the right graph of FIG. 2. The proprietary sensor exhibits several response lobes that are spaced over the desired wavelength range $\Delta\lambda_B$ (in an earlier example, ±12 nm from nominal). The example CFBG-SFP response depicted in the figure begins on the low-wavelength side with a 1.25 nm FSR (≈650 μm spacing) and ends on the high-wavelength side with a 1.75 nm FSR (≈450 μm spacing). Because the response derives from Fabry-Perot interference, the width of the lobes is increased relative to a standard FBG. Vertical dotted lines represent a narrow wavelength range used to interrogate the sensor (whereas the full 24 nm—the full width of the graphs—is required to interrogate distributed single-frequency FBGs). Wavelength is depicted relative to nominal (i.e., zero-strain) wavelength.

Figure 3:
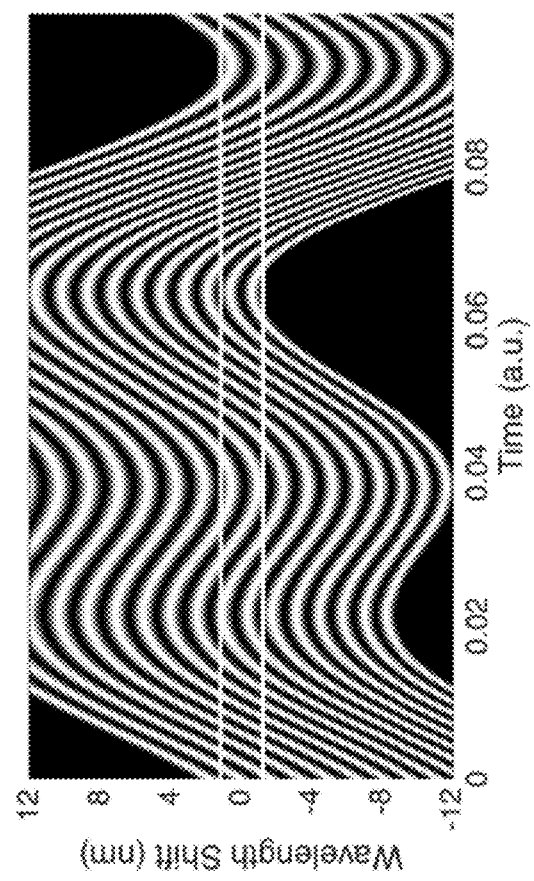
FIG. 3 is a graph depicting a comparison of reflection intensity with time-varying strain perturbation of: an example FBG spectrum (left) known to the inventor of this disclosure; and an example CFBG-SFP spectrum (right) in accordance with disclosed embodiments.
Figure 3:
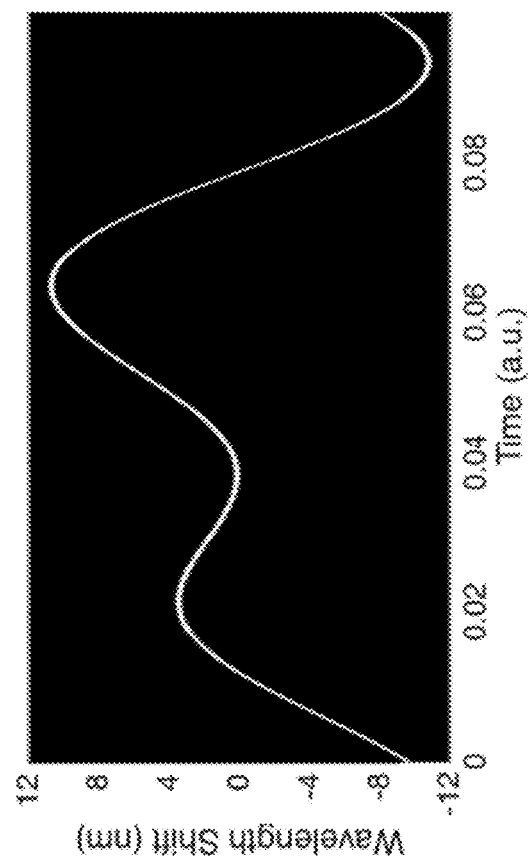

FIG. 3 is a graph depicting a comparison of reflection intensity with time-varying strain perturbation of: an example FBG spectrum (left) known to the inventor of this disclosure; and an example CFBG-SFP spectrum (right) in accordance with disclosed embodiments. Consider that the sensors depicted in the responses of FIG. 2 are perturbed by an axial strain as a function of time. The resulting perturbation of the standard and CFBG-SFP sensors is depicted in the left and right graphs, respectively, of FIG. 3 as a time-varying change in center wavelength of the lobes. Note that the responses from FIG. 2 are now depicted as grayscale intensity graphs as a function of time on the x-axis and wavelength shift on the y-axis. The right graph also shows two horizontal lines representing the same narrow wavelength range. One of ordinary skill in the art will readily see that there is now sufficient information within the narrow wavelength range to extract the full perturbation profile if there is always at least one peak within the narrow range and the peak may be absolutely identified (i.e., which of the several peaks depicted in FIG. 2, right, is/are present within the narrow wavelength range depicted by the horizontal lines of FIG. 3, right).

FIG. 4 is a diagram depicting an embodiment of a sensing unit including four CFBG-SFP sensors arranged along a portion of an optical fiber. The spectrum depicted in FIG. 2, right graph, may be obtained via a sensor constructed in accordance with the embodiment depicted in FIG. 4 and as discussed herein. In one embodiment, a sensor of this disclosure may be formed by superimposing two (or more) chirped fiber Bragg gratings (CFBGs), each having different chirp slope, with a precise nominal spacing between the two (or more) gratings. The sensor may be formed on or in a support structure (e.g., an optical fiber or portion thereof, without limitation). Two or more sensors may form a sensing unit.

In an embodiment depicted in FIG. 4 (notably, spacing between CFBGs and slope difference depicted by FIG. 4 are exaggerated for illustrative purposes), the FSR of each period (e.g., period 1, period 2, period 3, . . . period N depicted in FIG. 4) of the periodic spectral response differs from the FSR of its neighbors by a sufficient amount such that when strains at the extents of the design strain range are imposed on the fiber, the FSR is contained within a range distinguishable from its neighbor. Table 1 shows this more clearly for the first four peaks of the figure. This table shows minimum, nominal, and maximum FSR exhibited by the sensor corresponding to −10,000, 0, and +10,000 με imparted on the fiber sensor. As depicted in the table, the range of each FSR is unique and does not overlap the range of the FSR associated with neighboring peaks.

Note that the center spacing between CFBG-SFP sensors may be less than, equal to, or greater than the length of each CFBG-SFP sensor.

TABLE 1

FSR (Free Spectral Range) i.e., wavelength spacing between peaks X&Y for the first few peaks of FIG. 2, right.

| FSR Spanning Peaks X&Y | Min. FSR (−10,000 με) | Nom. FSR (0 με) | Max. FSR (+10,000 με) |
|---|---|---|---|
| 0&1 | 1.242 | 1.254 | 1.267 |
| 1&2 | 1.271 | 1.284 | 1.296 |
| 2&3 | 1.300 | 1.313 | 1.326 |
| etc. | | | |

By tailoring the chirp slopes and spacing of the CFBGs forming the CFBG-SFP sensor, a sensor FSR may be selected for each period of the response the range of which is unique from that of all other FSR ranges for the chosen supported strain range zle. Because each FSR in the spectral response of the sensor is unique for the design strain range, the FSR may be used (inferred via a precise measure of relative wavelength between peaks) to absolutely identify which peaks appear in the narrow wavelength range interrogated by the instrument. By characterizing the nominal wavelengths of all the peaks of the sensor spectral response in a calibration step before operation, the current wavelength of the given peaks within the swept wavelength range may be deduced and the strain may be inferred from the difference between current and nominal wavelengths.

The ability to infer an absolute wavelength shift between current and nominal conditions given a narrow wavelength range offers a system with tremendous advantages. The key advantage to the present innovation is that the wavelength range $\Delta \lambda_B$ required to accommodate a given strain dynamic range $\Delta \varepsilon$ is significantly decreased. For example, with an optimized sensor design, a ~10× reduction in required wavelength range may be attained. If the required interrogation wavelength range is reduced by a factor R, the resulting scan speed required to cover the wavelength range at system sample rate fs becomes $$k = \frac{\Delta v_B \cdot f_S}{R},$$

and thus, the required OFDR demodulation bandwidth for a given sensing length (i.e., maximum measurement path time-of-flight delay $\tau_M$) is also reduced by a factor R. Alternatively, for a given demodulation bandwidth either the sensing length or the system sample rate may be increased by a factor R. In the above example, a wavelength range twice the maximum FSR (in this example, 3.5 nm) is all that is required to infer strain across the entire strain range. For a standard OFDR system, a wavelength range of 24 nm is required to achieve the same strain range. In addition, if some level of time- and strain-invariance may be assumed relative to the system sample rate, the wavelength range may be as small as the maximum FSR across the response (1.75 nm in this example), offering a ~10× reduction in wavelength range required to demodulate the sensor.

The sensor embodiments described herein may be manufactured in volume via a single exposure per grating to a phase mask in a side-write configuration on a draw tower, leaving the bulk of the complexity of sensor fabrication to an initial (one-time) fabrication of the phase mask. Alternatively, the sensor may be manufactured by splitting a single output beam from a laser appropriate for writing FBGs using an optical beam splitter, then using mirrors and separate chirped FBG phase masks to expose the fiber simultaneously to the two CFBG patterns with different chirp slope and precise spacing.

One of ordinary skill in the art will recognize that the embodiments described herein have many benefits and advantages. For example, expanded measurement and analysis methodologies, improved test data acquisition and management, fast response, low volume, minimal intrusion, long life cycle, lower maintenance, high accuracy, and high reliability. Examples of applications include: flight research and acquisition of real-time flight data; monitoring and characterizing propulsion system performance; monitoring and characterizing electric motors and turbines; and improved instrumentation for improved measurement and analysis, generally. One of ordinary skill in the art will recognize other advantages and benefits, and other applications.

Some embodiments relate, generally, to a method. The method may include, sweeping an optical source across a subset of a wide-band spectral response range of a sensing unit; inspecting one or more of a period of a spectral response of the sensing unit and a phase of the spectral response of the sensing unit; and inferring an absolute wavelength shift of the sensing unit or a relative wavelength shift of the sensing unit responsive to the inspected spectral response.

Some embodiments relate, generally, to an optical frequency-domain reflectometry (OFDR) system. The OFDR system may include at least one sensor, an optical source, and a signal processor. The at least one sensor may be configured in accordance with embodiments of sensors disclosed herein. The optical source may be configured in accordance with embodiments of optical sources disclosed herein. In one embodiment, the optical source may be a swept optical source. It may be configured to sweep (e.g., with optical energy) a subset of a wide-band spectral response range of the at least one sensor. The signal process may be configured to inspect one or more of a period of a spectral response of the sensor and a phase of the spectral response of the sensor. The signal processor may be configured to infer an absolute wavelength shift of the sensor or a relative wavelength shift of the sensor in response to the inspected spectral response.

In one embodiment, an OFDR system in accordance with disclosed embodiments may include a controller. The controller may be configured to control, at least in part, an optical source in accordance with disclosed embodiments. The controller may be configured to control, at least in part, a signal processor in accordance with disclosed embodiments.

In a contemplated use, an OFDR system in accordance with disclosed embodiments may be deployed with an object of interest (e.g., object or device under test (DUT), without limitation) and characterize physical changes at an object of interest that correspond to physical changes (e.g., temperature change, strain change, without limitation) at a sensor.

Some embodiments relate, generally, to an interrogator. The interrogator may include an optical light source, a detector, an analog to digital converter, and a signal processor. The optical light source and signal processor may be configured in accordance with disclosed embodiments. In a contemplated use, an interrogator in accordance with disclosed embodiments may be used to interrogate a sensing unit, such as a sensing unit in accordance with disclosed embodiments, without limitation.

Figure 5:
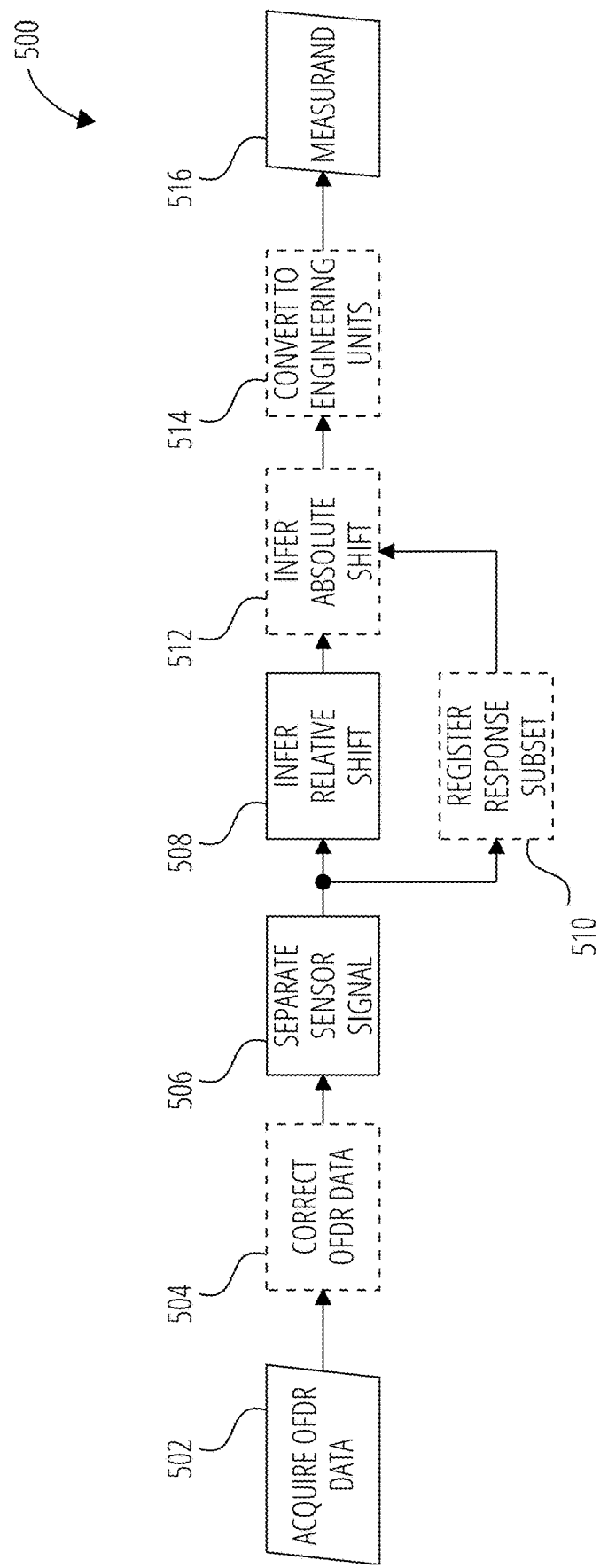
FIG. 5 is a functional flow diagram for digital signal processing circuitry, according to some embodiments.

FIG. 5 is a functional flow diagram for digital signal processing circuitry 500, according to some embodiments. The digital signal processing circuitry 500 may be used to demodulate and extract measurements (e.g., desired shift values) from fiber-optic sensors (e.g., the sensing fiber 116) discussed above. At operation 502 the digital signal processing circuitry 500 may acquire OFDR data according to OFDR techniques disclosed herein. For example, a laser may be swept substantially linearly in optical frequency. A reference beam and a signal beam may be interfered. An optical interference signal may be converted into an analog electronic signal via an opto-electronic conversion unit. The analog electronic signal may be converted to a digital signal via a signal digitization unit (e.g., an analog to digital converter). OFDR data acquired from the digital signal may be stored by a data storage device (e.g., a digital memory such as volatile memory and/or non-volatile memory). The OFDR data may be made available to a processing unit for data processing.

In some embodiments, at operation 504 the digital signal processing circuitry 500 may optionally correct the digital signal (i.e., the OFDR data). Correcting the OFDR data may include mitigating effects due to a non-ideal (e.g., nonlinear) laser sweep to produce a result closer to what would be expected for an ideal laser sweep. By way of non-limiting example, correcting the OFDR data may include interpolating the acquired OFDR data (acquired at operation 502) based on a known frequency evolution of the laser sweep, mixing based on a known frequency evolution of the laser sweep, and signal warping and/or filtering (e.g., using a Farrow filter).

At operation 506 the digital signal processing circuitry 500 may separate the sensor signal. Separating the sensor signal may include separating one or more signals from one or more particular sensors of interest from the composite OFDR data. By way of non-limiting example, separating the sensor signal may include performing a Fourier transform (e.g., a fast Fourier Transform (FFT)) on the acquired OFDR data; channelizing the acquired OFDR data via Fourier transform, linear filtering (e.g., finite impulse response (FIR) filtering, infinite impulse response (IIR) filtering, etc.), or combinations thereof; filtering the channelized data using, without limitation, a bandpass filter or a high-pass filter; performing a mixing operation on the filtered OFDR data (e.g., the channelized OFDR data), and filtering using a low-pass filter. In some embodiments performing a mixing operation includes multiplying the filtered OFDR data (e.g., having a frequency of θ by a sinusoid having a frequency γ (e.g., different from the frequency θ of the filtered OFDR data)). Since the product of two sinusoids (a mixing operation) having different frequencies is the sum of two sinusoids having different frequencies (e.g., a product-to-sum trigonometric identity such as $2 \cos \theta \cos \gamma = \cos(\theta-\gamma) + \cos(\theta+\gamma)$), a low-pass filter may be used to filter out the $\cos(\theta+\gamma)$ element of the mixed OFDR data to leave the $\cos(\theta-\gamma)$ element.

At operation 508 the digital signal processing circuitry 500 may infer a relative shift of a wavelength of a separated signal (e.g., separated in operation 506). Inferring the relative shift includes comparing and/or projecting the separated sensor signal (e.g., separated in operation 506) to/onto a basis or reference that produces a relative wavelength shift (e.g., using curve fitting, machine learning, and/or artificial intelligence). By way of non-limiting example, a properly trained machine learning algorithm would be capable of identifying the wavelength shift. In some embodiments inferring the relative shift may include comparing a current continuous-spectral-coverage sensor spectral response with that of a previous or a nominal state to infer a relative spectral shift between the two. Alternatively, inferring the relative shift may include taking a measure of the spectral shift of a known continuous spectral response relative to extents of a narrow OFDR sweep. In embodiments where a current shift is compared to a previous shift, an integration in time operation may be performed on the relative shift to yield an absolute shift since a starting point of operation, in time, or a nominal point in time.

Figure 6:
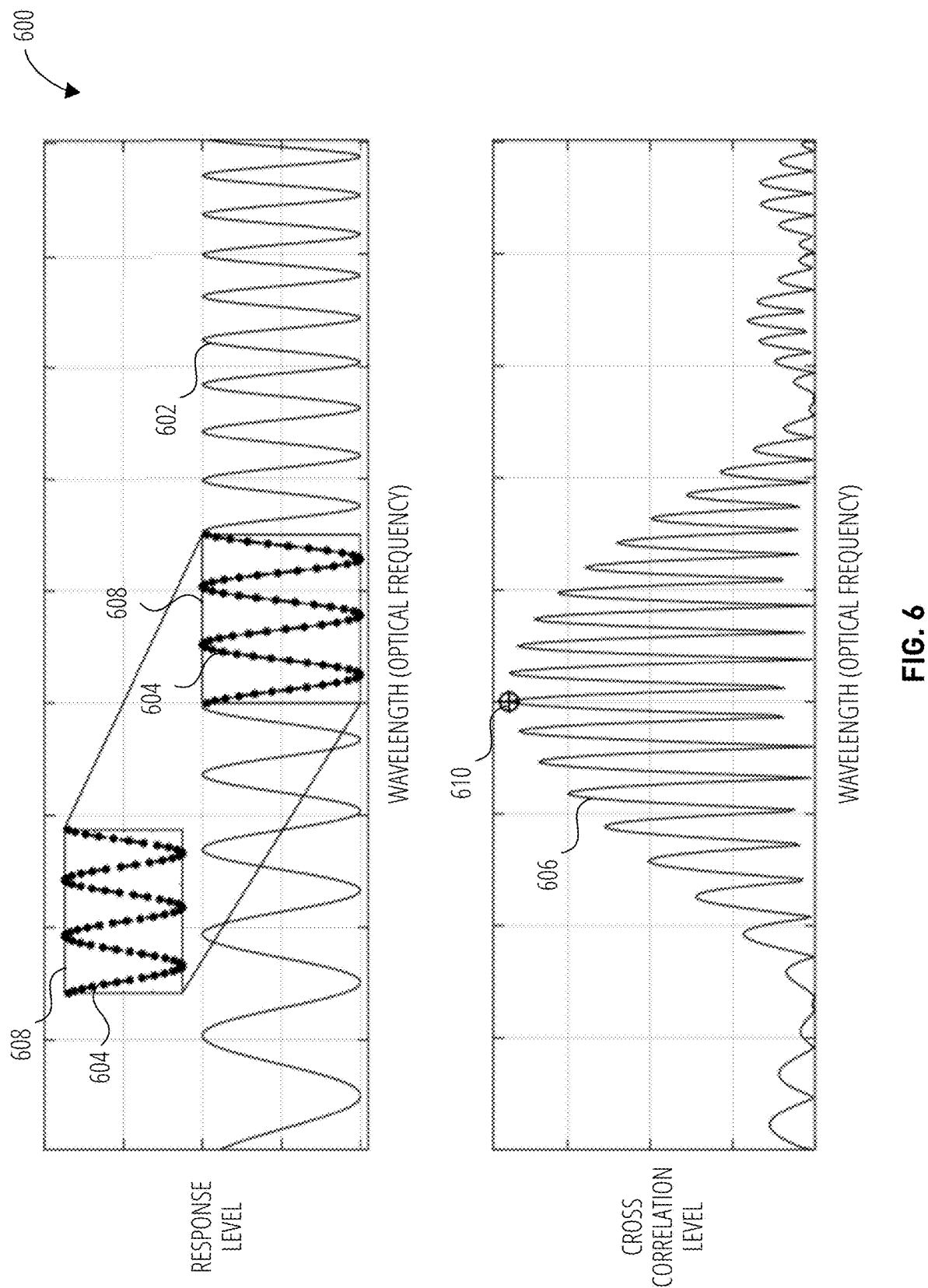
FIG. 6 is a plot illustrating a cross-correlation-based example of inferring a relative shift, according to some embodiments.

By way of non-limiting example, taking the measure of the spectral shift may include determining a cross-correlation between a current spectral response and a previous or nominal spectral response, an example of which is illustrated in FIG. 6. The previous or nominal spectral response may have a spectral range similar to or wider than a measured, current spectral response. Also by way of non-limiting example, taking the measure of the spectral shift may include taking a measure of a phase of a periodic response with respect to one or both extents of the narrow measured spectral range.

More detail regarding operation 508, inferring the relative shift, is discussed below with reference to FIG. 6, FIG. 7, and FIG. 8.

In some embodiments, at operation 510 the digital signal processing circuitry 500 may optionally register a response subset. Registering the response subset may include comparing the current, narrow sensor spectral response with a wider response. By way of non-limiting example, the wider response may have a width that is wider than the narrow spectral response and as wide as the total non-negligible spectral response of the continuous-spectral-coverage sensor. Registering the response subset may also include unambiguously determining the subset of the wider spectral response that corresponds with the current, narrow spectral response. By way of non-limiting example, registering the response subset may include taking a measure of the period of a periodic, current, narrow spectral response, and correlating this measure with that of a corresponding period of the wider spectral response. This may be accomplished by a cross-correlation of the narrow, current spectral response with a wider, nominal spectral response, without limitation. This may also be accomplished by correlation with a basis function representing a portion or portions of the wider spectral response. This may further be accomplished via a least-squares or other fit with a basis function representation of a portion or portions of the wider spectral response.

In some embodiments, at operation 512 the digital signal processing circuitry 500 may optionally infer an absolute shift. Inferring the absolute shift may include combining the precise relative shift and the identified approximate absolute location of the narrow spectrum. The narrow spectral response is located within the wider, nominal (or previous) spectral response to create a precise absolute wavelength shift from a nominal (or previous) state. Inferring the absolute shift may be augmented with information known about the nominal (or previous) spectral response function. By way of non-limiting example, accurate wavelengths (optical frequencies) of notable spectral features within the continuous spectral coverage response of the sensor may be used. When augmented with accurate absolute information, the overall measurement becomes as accurate as the absolute information known for the nominal spectral response. In some embodiments the spectral shift may be provided as a measurand 516, for example in terms of strain and/or temperature.

In some embodiments inferring the absolute shift may include using a least-squares or other fit incorporating a number of measurements and using averaged periods to calculate an additional offset to be added to the relative shift to yield the full absolute shift. Over total strain and temperature range, the response may be designed with periodicity to enable performance of a fit and an unambiguous identification of which features are within the narrow range. With a calibration operation, wavelengths corresponding to specific spectral feature characteristics may be known.

At operation 514 the digital signal processing circuitry 500 may optionally convert the spectral shift to engineering units. If desired, the spectral shift may be converted to engineering units appropriate for the application and provided as the measurand 516. By way of non-limiting example, fiber-Bragg grating sensors written in typical acrylate-coated single-mode optical fiber yield an approximately 10 picometer (pm) per ° C. shift with temperature, or a 1.2 pm/µε shift with strain. Spectral shift could also be converted to other desired measurands including but not limited to pressure, shear, vibration, acoustic emissions, weight, etc.

FIG. 6 is a plot 600 illustrating a cross-correlation-based example of operation 508 (infer relative shift) of FIG. 5, according to some embodiments. The plot 600 includes a wideband response plot 602, a narrowband response plot 604, and a cross correlation plot 606. The narrowband response plot 604 is illustrated within a narrowband window 608. It is desired to identify a position of the narrowband window 608 relative to the wideband response plot 602 to infer the relative shift. The wideband response plot 602 is used as a reference/calibrated version as the basis. Cross correlation of the narrowband response plot 604 with a reference signal (the wideband response plot 602) may be used to identify the relative shift. Cross correlation with the wide bandwidth signal (wideband response plot 602) identifies the position of the measured narrowband window 608 relative to the wideband response plot 602. By way of non-limiting example, the position of the narrowband window 608 relative to the wideband response plot 602 may be identified responsive to a cross correlation peak 610 (e.g., a global maximum) of the cross correlation plot 606. Comparison between the narrowband response plot 604 and the wideband response plot 602 gives the relative or absolute shift.

Small relative shifts in the narrowband response relative to the wideband response may be measured and accumulated over time in substantially real-time, which gives a real-time measurement that may be periodically verified and/or updated with precise non-real-time fitting of the period, yielding improved absolute accuracy. An example of how accumulation may be performed is provided in FIG. 7.

Figure 7:
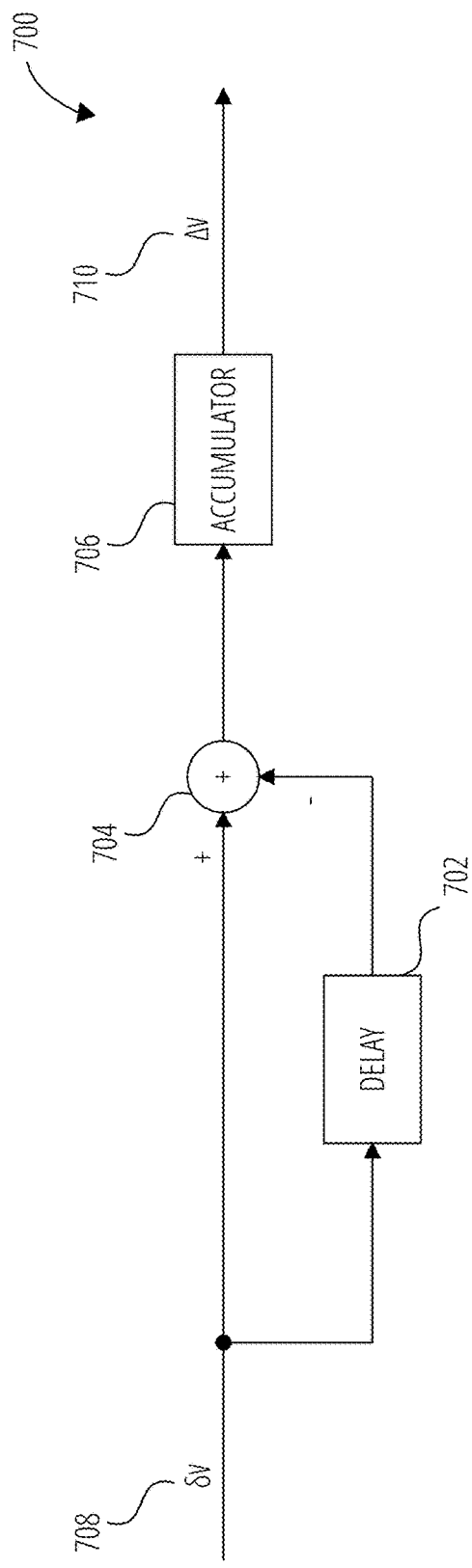
FIG. 7 is a block diagram of an accumulation system, which may be used to infer the relative shift, according to some embodiments.

FIG. 7 is a block diagram of an accumulation system 700, which may be used in operation 508 (infer relative shift) of FIG. 5, according to some embodiments. The accumulation system 700 includes a delay network 702, a summer 704, and an accumulator 706. A measured shift δv 708 is provided to the delay network 702, and a delayed version of δv 708 from the delay network 702 is subtracted from δv 708 using the summer 704. A signal provided by the summer 704 is provided to the accumulator 706, which outputs the relative shift Δv 710.

Figure 8:
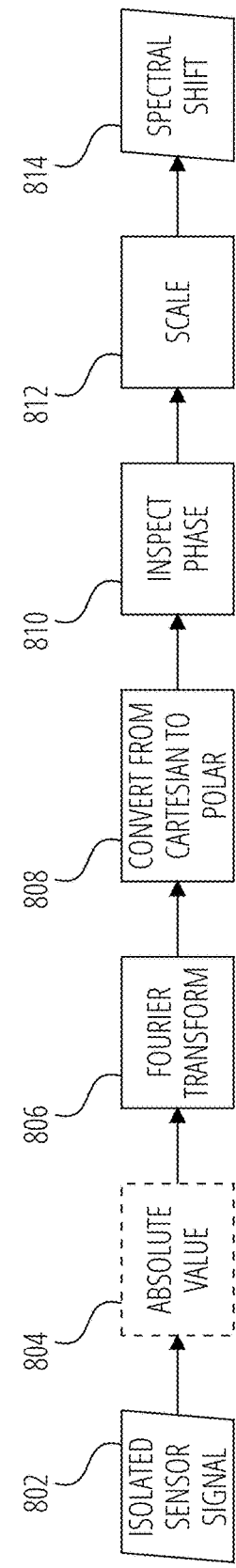
FIG. 8 is a functional flow diagram of Fourier series processing, which may be used to infer the relative shift, according to some embodiments.

FIG. 8 is a functional flow diagram of Fourier series processing 800, which may be used in operation 508 (infer relative shift) of FIG. 5, according to some embodiments. The Fourier series processing 800 takes as input an isolated sensor signal 802 resulting from operation 506 (separate sensor signal) of FIG. 5. At operation 804 the Fourier series processing 800 optionally includes determining an absolute value of the isolated sensor signal 802. Application of the absolute value function may yield a sinusoidal function with a phase that includes the difference in optical time of flight between a measurement path and a reference path of an OFDR system. Although operation 804 (determining an absolute value) is not required, it may be helpful to distinguish between phase resulting from a combination of two CFBG sensors of a composite sensor (i.e., differential phase), and phase resulting from the interference of the sensor field with the reference field (i.e., the average absolute phase).

At operation 806 the Fourier series processing 800 includes determining a Fourier transform (e.g., a fast Fourier transform (FFT)) of the isolated sensor signal 802 (or on the absolute value of the isolated sensor signal 802 in embodiments including operation 804). Comparison of the sensor signal substantially simultaneously with a set of zero-phase sinusoids may be accomplished by way of a Fourier transform. Determination of a Fourier transform involves identifying various elements of the isolated sensor signal 802, each element corresponding to a different frequency component of the isolated sensor signal 802. The sum of the elements is substantially equal to the isolated sensor signal 802 (or the absolute value of the isolated sensor signal 802 in embodiments including operation 804). One of the elements may have a higher magnitude than others of the elements. This element is referred to herein as the "highest magnitude element."

At operation 808 the Fourier transform processing 800 includes converting the elements of the Fourier transform from Cartesian to polar coordinates. Converting the elements from Cartesian to polar coordinates includes identifying a magnitude and phase of each element of the Fourier transform. The phase of each element of the Fourier transform is the phase-delay between the particular zero-phase sinusoid and the given sinusoidal component of the isolated sensor signal 802 (or the absolute value of the isolated sensor signal 802 in embodiments including operation 804).

At operation 810 the Fourier series processing 800 includes inspecting the phase of each element of the Fourier transform, as identified in operation 808. Inspecting the phase includes identifying a phase of the highest magnitude element and returning the phase of the highest magnitude element.

At operation 812 the Fourier transform processing 800 includes scaling the phase of the highest magnitude element by an inverse of a frequency of the highest magnitude element. Scaling the phase includes returning the scaled value as a spectral shift 814.

In some embodiments multiple elements of the Fourier transform may have significant (e.g., non-negligible) magnitude. These elements may be considered, scaled by the inverse of the corresponding frequency of the elements, and then added together in a weighted manner to produce a more accurate phase (shift) value for the spectral shift 814.

It is also noted that stable calculation of the spectral shift 814 may include calculating the spectral shift 814 as a differential quantity with respect to a previous sample of the spectral shift 814 and a subsequent accumulation and/or integration to yield the resulting shift in optical wavelength Δv.

It is further noted that the Fourier series processing 800 of FIG. 8 may be used in a real-time hardware system to determine the spectral shift 814.

Figure 9:
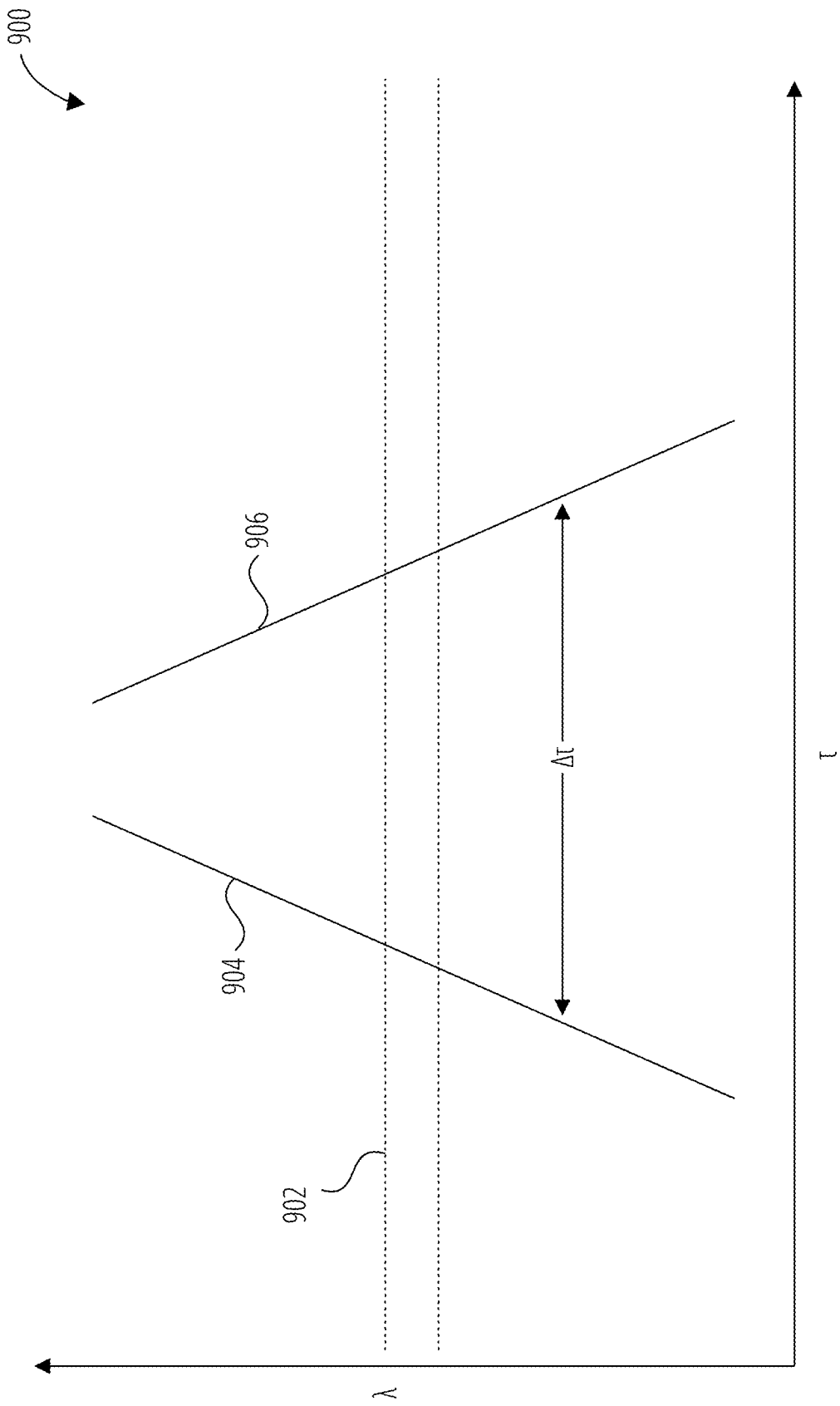
FIG. 9 is a plot illustrating chirp slopes of an example CFBG sensor, according to some embodiments.

FIG. 9 is a plot 900 illustrating chirp slopes 904, 906 of grating of an example CFBG sensor, according to some embodiments. A vertical region between dotted lines 902 illustrate a narrow laser scan range used to interrogate the sensor. The chirp slope of the constituent CFBGs that make up the composite sensor exhibiting continuous spectral coverage need not have a same chirp slope sign. For example, one CFBG could have a negative chirp slope (e.g., negative chirp slope 906) while another could have a positive chirp slope (e.g., positive chirp slope 904), as illustrated in FIG. 9.

In addition, a composite sensor exhibiting continuous spectral coverage need not entirely include chirped fiber Bragg gratings. For example, a standard fiber Bragg grating may be used together with a chirped fiber Bragg grating (not shown). In such embodiments a substantially vertical line represents a standard FBG. The mean reflection location of such a standard FBG does not vary substantially with probe laser wavelength. The mean reflection location of the CFBG sensor of FIG. 9, however, does vary substantially with interrogation laser wavelength. Accordingly, the free spectral range of the sensor may vary as the interrogation wavelength is varied.

Figure 10:
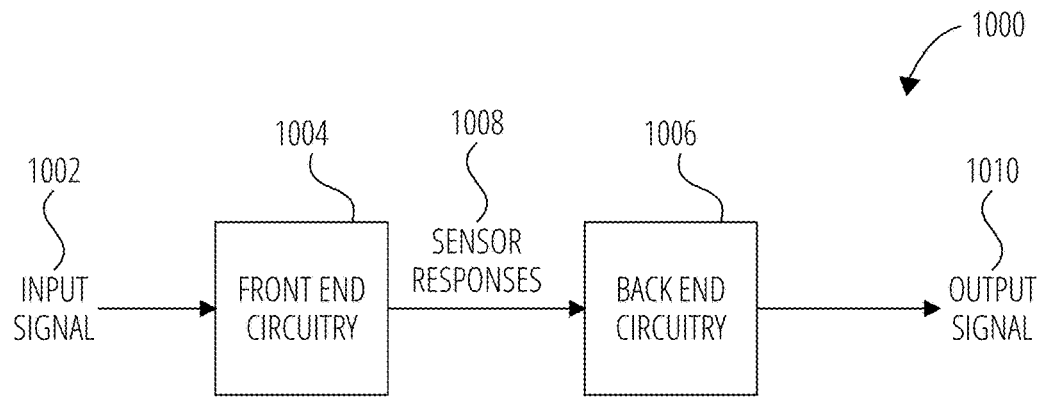
FIG. 10 is a block diagram of digital signal processing circuitry, according to some embodiments.

FIG. 10 is a block diagram of digital signal processing circuitry 1000, according to some embodiments. The digital signal processing circuitry 1000 may be used to demodulate and extract measurements (e.g., desired shift values) from fiber-optic sensors discussed above. The digital signal processing circuitry 1000 includes front end circuitry 1004 configured to receive an input signal 1002 (e.g., from a fiber-optic interferometer such as the fiber-optic interferometer 114 of FIG. 1). By way of non-limiting example, the input signal 1002 may include acquired OFDR data such as that discussed with reference to the operation 502 (acquire OFDR data) of FIG. 5. The front end circuitry 1004 is configured to isolate sensor responses 1008 from the input signal 1002. The digital signal processing circuitry 1000 also includes back end circuitry 1006 configured to receive the sensor responses 1008 from the front end circuitry 1004 and provide an output signal 1010 indicating phase shifts of the sensor responses.

Functional flows for examples of both the front end circuitry 1004 and the back end circuitry 1006 are discussed below with reference to FIG. 11 and FIG. 12, respectively. As used herein, the term "front end" refers to preliminary processing of raw data streams including sensors (e.g., the sensing fiber 116) through to the process of isolating the response of each sensor. The front end processing performed by the front end circuitry 1004 may occur once per OFDR wavelength sweep for the sensors. By way of non-limiting example, operations 502, 504, and 506 discussed above with reference to FIG. 5 may include front end processing.

As used-herein, the term "back end" refers to follow-on processing specific to each sensor of a sensing fiber. Thus, the back end processing may be performed by the back end circuitry 1006 once for each sensor per OFDR wavelength sweep. Also, back end processing is repeated or parallelized N times per sweep, corresponding to a number N of sensors in a sensing fiber (e.g., the sensing fiber 116). By way of non-limiting example, operations 508, 510, 512, and 514 discussed above with reference to FIG. 5 may be back end processing.

Sensing fibers according to embodiments disclosed herein may include continuous spectral coverage sensors because of a substantially sinusoidal nature of a response of the sensors, which represents a truly continuous signal across the response spectrum of the sensor.

Figure 11:
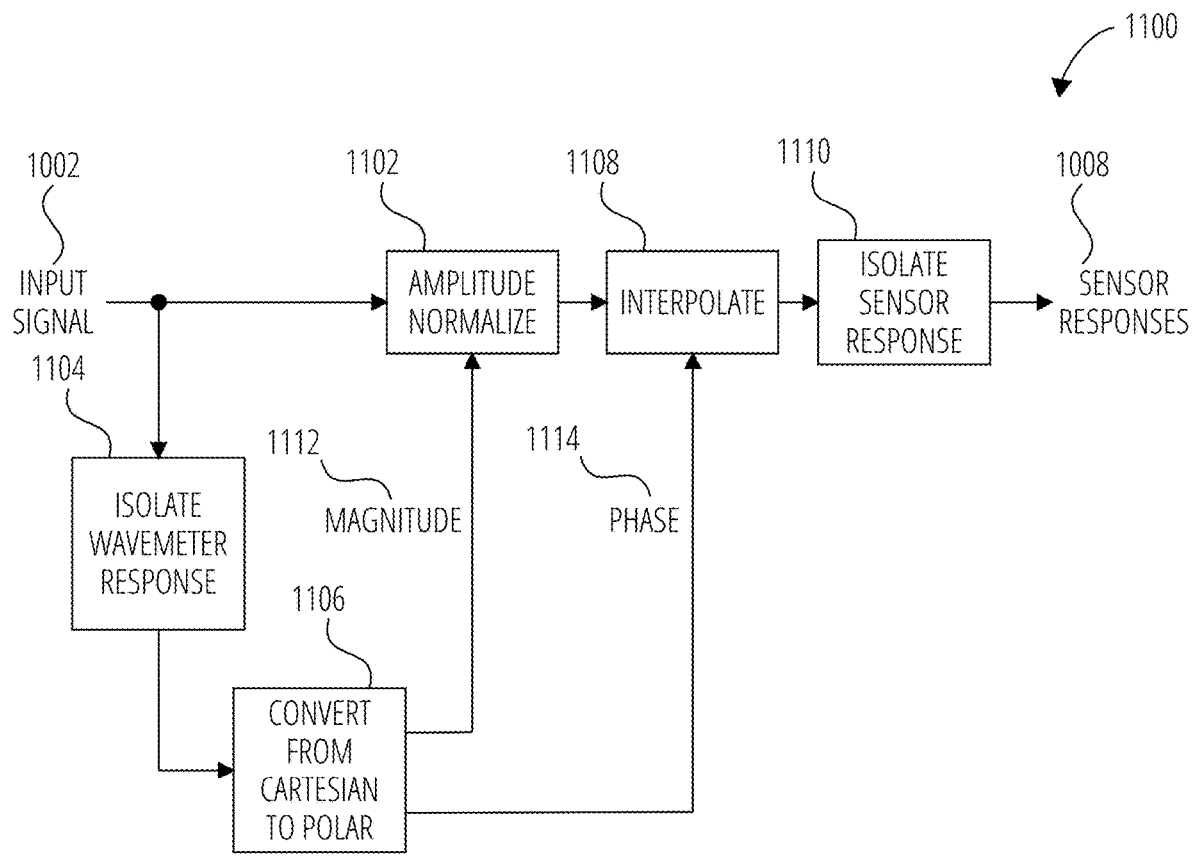
FIG. 11 is an example of a functional flow diagram for front end circuitry, which may be performed by front end circuitry of FIG. 10, according to some embodiments.

FIG. 11 is an example of a functional flow diagram for front end circuitry 1100, which may be performed by the front end circuitry 1004 of FIG. 10, according to some embodiments. FIG. 11 illustrates the case of a wavemeter signal being embedded in the multi-sensor signal as may happen in a real-world system. At operation 1104 the front end circuitry 1100 may isolate the wavemeter response. For operation 1104 there are several options for inferring this signal. For example, a mix-down stage, followed by a chain of halfband decimation stages, followed by a chain of halfband interpolation stages to efficiently generate a correction signal at full sample rate may be used. A Fourier transform (e.g., FFT) filtering method may also be used. A further option is to use infinite impulse response (IIR) filtering.

Once the wavemeter signal is bandpass filtered at operation 1104, at operation 1106 the output is converted to a magnitude 1112 and phase 1114 (e.g., using a Cartesian to polar coordinate conversion). At operation 1102 the front end circuitry 1100 uses the magnitude 1112 to normalize the amplitude of the incoming signal to correct for laser output power variation, if necessary. Operation 1102 may not be needed if the laser exhibits good power repeatability or linearity over the sweep. At operation 1108 the phase 1114 is used to interpolate the incoming data (e.g., the input signal 1002) to compensate for the nonlinearity of the laser sweep. Operation 1108 may be necessary to a degree to ensure that individual sensor responses can be separated in the delay domain. If the laser sweep is already sufficiently linear, however, operation 1108 (interpolating the incoming data based on the phase 1114) may not be required. In some embodiments operation 1108 (interpolating the incoming data) may be eliminated if some linearization or calibration is applied to the analog waveforms.

At operation 1110 the OFDR system 100 may isolate the sensor response for each sensor. Several options are available for operation 1110, including a long FFT followed by many small inverse FFTs (IFFTs), a short-time Fourier transform, a weighted overlap-add transform, or a polyphase filter bank channelizer.

The front end circuitry 1100 is configured to compensate the input wideband signal (input signal 1002) for laser amplitude and sweep fluctuations, and sensor responses are separated into small (e.g., 32- or 64-sample) vectors representing a spectral response for each sensor as sensor responses 1008.

Figure 12:
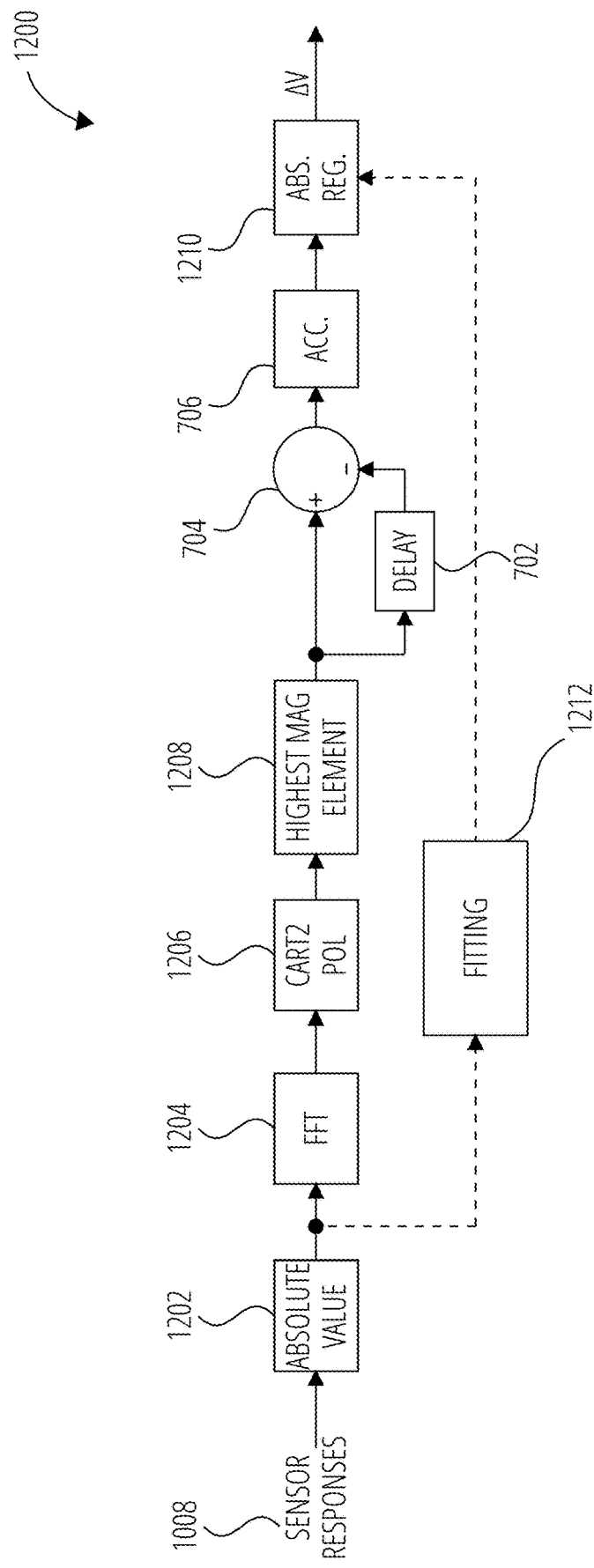
FIG. 12 is an example of a functional flow diagram for back end circuitry, which may be performed by back end circuitry of FIG. 10, according to some embodiments.

FIG. 12 is an example of a functional flow diagram for back end circuitry 1200, which may be performed by the back end circuitry 1006 of FIG. 10, according to some embodiments. In this example, 32-sample waveforms are available for each sensor representing substantially 10 mm of delay-domain signal (appropriate for sensors spaced at 10 mm). A basis function may be mixed with the sensor spectral response, and then the phase angle may be extracted to yield the phase that is proportional to the strain measurement (strain of the sensor such as the sensing fiber 116 of FIG. 1). This basis function may be a number of different functions. A non-limiting example embodiment of one particular application, namely a set of sinusoidal basis functions, follows.

The spectral response of the composite CFBG sensor may be well approximated by a sinusoid, especially if the power ratio of the two CFBGs forming the composite sensor is such that the amplitude of the cosine term is smaller than the offset. At operation 1202 the back end circuitry 1200 may compute an absolute value of sensor responses 1008. In this case the cosine term is equal to the cosine term and there is substantially no rectification of the signal due to the absolute value step.

A simultaneous set of sinusoids may be applied as basis functions at operation 1204 by performing an FFT on the absolute value of the sensor responses 1008. Each element of the FFT is the correlation of a zero-phase sinusoid with the sensor signal. The phase of the k-th element of the FFT yields the phase delay between a sinusoid with a number M of periods and a sinusoidal component of the same frequency from the sensor signal (e.g., sensor responses 1008). At operation 1206 the back end circuitry 1200 may convert the FFT output from real/imaginary to magnitude and phase (e.g., using a Cartesian to polar coordinate conversion). At operation 1208 the magnitude and phase may be used to find the index k of the FFT element with the highest magnitude (i.e., the highest magnitude element). The highest magnitude element is the sinusoidal component most closely correlated with the periodic sensor waveform. The phase of the FFT element at index k may be selected. This phase is the shift of the sensor waveform measured against a sinusoid with k periods across the range.

The delay network 702, the summer 704, and accumulator 706 may then be used as discussed above with reference to FIG. 7. At operation 1210 absolute registration may be performed. The current phase may be compared to the phase from the previous scan and unwrap at $-\pi, \pi$ boundaries. In some embodiments the result may be divided by k to yield the shift relative to the entire window (i.e., relative to the narrow OFDR wavelength range). In some embodiments the shift may be scaled by the scan range $\Delta\lambda$. The result is the wavelength shift $\Delta v$ of the sensor.

The back end circuitry 1200 may be modified to take data from the entire FFT into account by using weights equivalent to the magnitude of the FFT and by using a scaled phase from the previous scan to compare phases of all M samples of the FFT. The operations of the back end circuitry 1200 may be expanded to a substantially real-time measurement of period, yielding a real-time absolute measurement.

FIG. 12 illustrates that, optionally, once every scan or several scans, sensor waveforms for a given sensor are processed for real-time or non-real-time fitting (for example, least-squares fitting, without limitation) at operation 1212. In some embodiments the fitting may be performed by an embedded subsystem. In such embodiments the accumulator value corresponding to the relative wavelength shift may also be transferred to the embedded subsystem. Several of these periods may be averaged by taking the accumulator value into account, and an offset created to add to the relative measurement in operation 1210 (absolute registration) to yield an accurate absolute measurement for $\Delta v$.

The back end circuitry 1200 of FIG. 12 is particularly amenable to implementation in a system on chip (SoC). For example, a small 32-sample or 64-sample FFT may be efficiently implemented in an FPGA and pipelined such that a single FFT engine processes data from many sensors sequentially. This distributes processing resources across many sensors and leads to an efficient implementation. As another example, Cartesian to polar conversion (operation 1206) may be efficiently performed via a CORDIC computation module.

Thus, the output value may be updated periodically and may be accurate after an absolute registration event (e.g., operation 1210). The rate of change that may be accommodated by the sensor is tunable; that is, a smaller spacing between the sensors to widen the period of the spectral response may be used, allowing for faster environmental perturbations.

As discussed above, a cross-correlation may also be used to identify the shift of the sensor. A possible implementation of this may use the full signal as a base, with which the measured narrowband signal is cross correlated. This may yield a peak (e.g., cross correlation peak 610 of FIG. 6) in the correlation at the best match for the sensor. A comparison of this with a previously determined reference location may yield the desired shift measurement.

Figure 13:
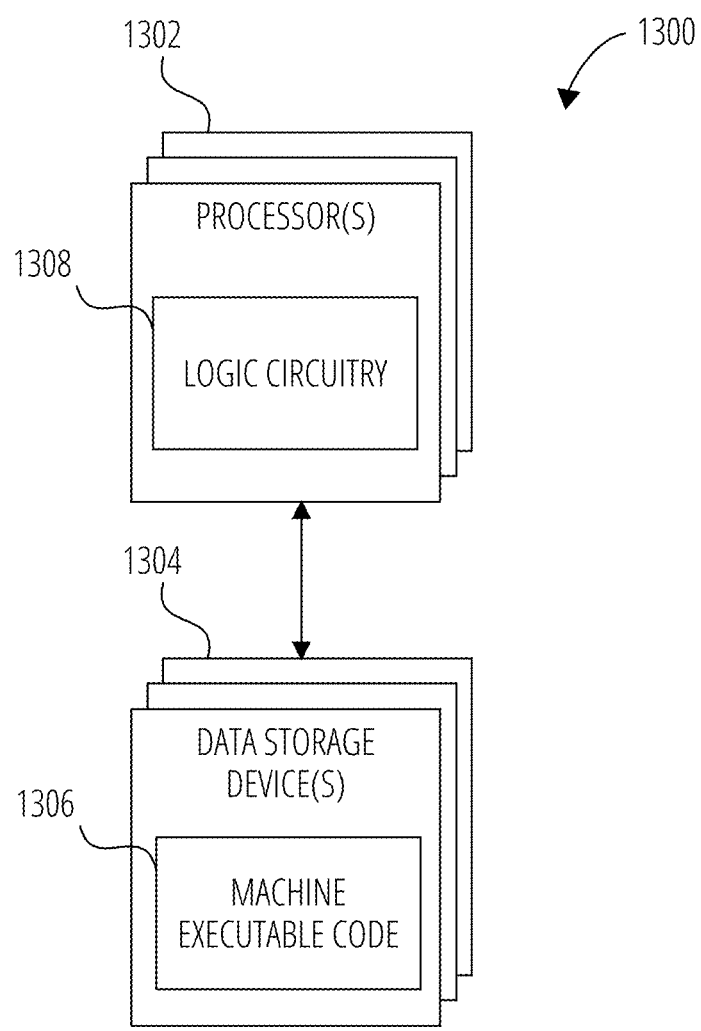
FIG. 13 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 13 illustrates non-limiting examples of implementations of functional elements disclosed herein. In some embodiments, some or all portions of the functional elements disclosed herein may be performed by hardware specially configured for carrying out the functional elements.

FIG. 13 is a block diagram of circuitry 1300 that, in some embodiments, may be used to implement various functions, operations, acts, processes, and/or methods disclosed herein. The circuitry 1300 includes one or more processors 1302 (sometimes referred to herein as "processors 1302") operably coupled to one or more data storage devices (sometimes referred to herein as "storage 1304"). The storage 1304 includes machine executable code 1306 stored thereon and the processors 1302 include logic circuitry 1308. The machine executable code 1306 includes information describing functional elements that may be implemented by (e.g., performed by) the logic circuitry 1308. The logic circuitry 1308 is adapted to implement (e.g., perform) the functional elements described by the machine executable code 1306. The circuitry 1300, when executing the functional elements described by the machine executable code 1306, should be considered as special purpose hardware configured for carrying out functional elements disclosed herein. In some embodiments the processors 1302 may be configured to perform the functional elements described by the machine executable code 1306 sequentially, concurrently (e.g., on one or more different hardware platforms), or in one or more parallel process streams.

When implemented by logic circuitry 1308 of the processors 1302, the machine executable code 1306 is configured to adapt the processors 1302 to perform operations of embodiments disclosed herein. For example, the machine executable code 1306 may be configured to adapt the processors 1302 to perform at least a portion or a totality of the operations of the digital signal processing circuitry 500 of FIG. 5, the accumulation system 700 of FIG. 7, the Fourier series processing 800 of FIG. 8, the digital signal processing circuitry 1000 of FIG. 10, the front end circuitry 1100 of FIG. 11, and/or the back end circuitry 1200 of FIG. 12.

The processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 1306 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1302 may include any conventional processor, controller, microcontroller, or state machine. The processors 1302 may also be implemented as a combination of computing devices, such as a combination of a DSP and a microprocessor, a plurality of microprocessors, one or more microprocessors in conjunction with a DSP core, or any other such configuration.

In some embodiments the storage 1304 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1302 and the storage 1304 may be implemented into a single device (e.g., a semiconductor device product, a system on chip (SOC), etc.). In some embodiments the processors 1302 and the storage 1304 may be implemented into separate devices.

In some embodiments the machine executable code 1306 may include computer-readable instructions (e.g., software code, firmware code). By way of non-limiting example, the computer-readable instructions may be stored by the storage 1304, accessed directly by the processors 1302, and executed by the processors 1302 using at least the logic circuitry 1308. Also by way of non-limiting example, the computer-readable instructions may be stored on the storage 1304, transferred to a memory device (not shown) for execution, and executed by the processors 1302 using at least the logic circuitry 1308. Accordingly, in some embodiments the logic circuitry 1308 includes electrically configurable logic circuitry 1308.

In some embodiments the machine executable code 1306 may describe hardware (e.g., circuitry) to be implemented in the logic circuitry 1308 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1306 may include an HDL, an RTL, a GL description, a mask level description, other hardware description, or any combination thereof.

In embodiments where the machine executable code 1306 includes a hardware description (at any level of abstraction), a system (not shown, but including the storage 1304) may be configured to implement the hardware description described by the machine executable code 1306. By way of non-limiting example, the processors 1302 may include a programmable logic device (e.g., an FPGA or a PLC) and the logic circuitry 1308 may be electrically controlled to implement circuitry corresponding to the hardware description into the logic circuitry 1308. Also by way of non-limiting example, the logic circuitry 1308 may include hard-wired logic manufactured by a manufacturing system (not shown, but including the storage 1304) according to the hardware description of the machine executable code 1306.

Regardless of whether the machine executable code 1306 includes computer-readable instructions or a hardware description, the logic circuitry 1308 is adapted to perform the functional elements described by the machine executable code 1306 when implementing the functional elements of the machine executable code 1306. It is noted that although a hardware description may not directly describe functional elements, a hardware description indirectly describes functional elements that the hardware elements described by the hardware description are capable of performing.

It is to be understood that the features of the various embodiments described herein were not mutually exclusive and can exist in various combinations and permutations, even if such combinations or permutations were not made express herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

Although each operation illustrated by or in connection with the figures and text recites acts performed in a particular order, embodiments of the present disclosure do not necessarily need to operate in that recited order. One of ordinary skill in the art would recognize many variations, including performing acts in parallel, or in a different order.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of operating a digital signal processing circuitry, the method comprising:
   acquiring optical frequency domain reflectometry (OFDR) data from an interferometer operably coupled to a tunable laser and a sensing fiber including a multi-spectral feature sensor including chirped fiber-Bragg gratings (CFBGs);
   separating sensor signals corresponding to sensors of the sensing fiber from the OFDR data; and
   comparing a measured narrowband response of a separated sensor signal to a known wideband response of the multi-spectral feature sensor to infer a relative shift of the separated sensor signal.

2. The method of claim 1, further comprising correcting the OFDR data prior to the separating the sensor signals.

3. The method of claim 1, further comprising inferring an absolute shift of the separated sensor signal.

4. The method of claim 1, wherein comparing the measured narrowband response of the separated sensor signal to the known wideband response of the multi-spectral feature sensor comprises comparing the separated sensor signal to a basis signal or a reference signal, the reference signal corresponding to a nominal, wideband response of the multi-spectral feature sensor.

5. The method of claim 1, wherein comparing the measured narrowband response of the separated sensor signal to the known wideband response of the multi-spectral feature sensor comprises:
   determining a Fourier transform of the separated sensor signal;
   converting elements of the Fourier transform from Cartesian coordinates to polar coordinates to provide a magnitude and a phase for the elements of the Fourier transform;
   inspecting the phase for the elements of the Fourier transform to identify a phase of a highest magnitude element of the Fourier transform; and
   scaling the highest magnitude element of the Fourier transform by an inverse of a frequency of the highest magnitude element.

6. The method of claim 5, wherein comparing the measured narrowband response of the separated sensor signal to the known wideband response of the multi-spectral feature sensor comprises:
   determining a Fourier transform of the separated sensor signal;
   converting elements of the Fourier transform from Cartesian coordinates to polar coordinates to provide a magnitude and phase for the elements of the Fourier transform;
   inspecting the phase for at least some of the elements of the Fourier transform; and
   generating a weighted average of the at least some of the elements of the Fourier transform.

7. The method of claim 5, further comprising determining an absolute value of the separated sensor signal, wherein determining the Fourier transform of the separated sensor signal comprises determining the Fourier transform of the absolute value of the separated sensor signal.

8. The method of claim 1, wherein inferring the relative shift of the separated sensor signal comprises determining a cross-correlation between the separated sensor signal and a basis signal or a reference signal.

9. The method of claim 1, wherein inferring the relative shift of the separated sensor signal comprises subtracting a previous version of a measured shift from the measured shift, and providing a result to an accumulator.

10. A digital signal processing circuitry, comprising:
    a front end circuitry configured to isolate sensor responses from an input signal including optical frequency domain reflectometry (OFDR) data, the input signal received from a multi-spectral feature sensor; and
    a back end circuitry configured to determine a phase shift corresponding to each isolated sensor response by comparing a measured narrowband response of each isolated sensor response to a known wideband response of the multi-spectral feature sensor to infer a relative shift of the isolated sensor responses.

11. The digital signal processing circuitry of claim 10, wherein the front end circuitry is configured to correct the OFDR data to mitigate effects of a non-linear laser sweep.

12. The digital signal processing circuitry of claim 10, wherein the front end circuitry is configured to separate the sensor signal by:
    performing a Fourier transform on the OFDR data;
    channelizing the OFDR data;
    filtering the channelized OFDR data;
    performing a mixing operation on the filtered OFDR data; and
    filtering a mixed OFDR data using a low-pass filter.

13. The digital signal processing circuitry of claim 12, wherein the front end circuitry is configured to channelize the OFDR data via a Fourier transform.

14. The digital signal processing circuitry of claim 12, wherein the front end circuitry is configured to channelize the OFDR data via linear filtering.

15. The digital signal processing circuitry of claim 12, wherein the front end circuitry is configured to filter OFDR data using a bandpass filter.

16. The digital signal processing circuitry of claim 12, wherein the front end circuitry is configured to filter OFDR data using a mix-down operation and a low-pass filter.

17. The digital signal processing circuitry of claim 10, wherein the back end circuitry is configured to identify a highest magnitude element of a Fourier transform of each isolated sensor response and determine the phase shift based, at least in part, on the identified highest magnitude element.

18. The digital signal processing circuitry of claim 17, wherein the back end circuitry is configured to identify the highest magnitude element by converting the Fourier transform from Cartesian coordinates to polar coordinates to identify a magnitude and a phase of each element of the Fourier transform.

19. The digital signal processing circuitry of claim 17, wherein the back end circuitry is configured to determine a relative phase shift of the identified highest magnitude element.

20. The digital signal processing circuitry of claim 19, wherein the back end circuitry includes an accumulator system including a delay network and a summer configured to receive the relative phase shift of the identified highest magnitude element, the summer configured to subtract a previous version of the relative phase shift from the relative phase shift, the accumulator system further comprising an accumulator configured to receive an output of the summer.

\* \* \* \* \*

UNITED STATES PATENT AND TRADEMARK OFFICE
CERTIFICATE OF CORRECTION

PATENT NO. : 11,385,130 B2
APPLICATION NO. : 17/301730
DATED : July 12, 2022
INVENTOR(S) : Ryan Seeley It is certified that error appears in the above-identified patent and that said Letters Patent is hereby corrected as shown below:

In the Specification

Column 9, Line 5, change "zle" to -- $\Delta\varepsilon$ --

Signed and Sealed this
Twenty-eighth Day of March, 2023

Katherine Kelly Vidal
*Director of the United States Patent and Trademark Office*